US011629953B2

(12) United States Patent
De Nisco et al.

(10) Patent No.: US 11,629,953 B2
(45) Date of Patent: *Apr. 18, 2023

(54) DEVICES FOR DETECTING PAINTING DEFECTS ON AT LEAST ONE PAINTED SURFACE TO BE INSPECTED

(71) Applicant: TEKNO IDEA S.r.l., Pescara (IT)

(72) Inventors: Bruno De Nisco, Pescara (IT); Alessandro Di Girolamo, Pescara (IT)

(73) Assignee: TEKNO IDEA S.R.L., Pescara (IT)

( * ) Notice: Subject to any disclaimer, the term of this patent is extended or adjusted under 35 U.S.C. 154(b) by 66 days.

This patent is subject to a terminal disclaimer.

(21) Appl. No.: 17/380,285

(22) Filed: Jul. 20, 2021

(65) Prior Publication Data

US 2021/0348917 A1 Nov. 11, 2021

Related U.S. Application Data

(63) Continuation of application No. 16/629,530, filed as application No. PCT/IB2018/055041 on Jul. 9, 2018, now Pat. No. 11,105,614.

(30) Foreign Application Priority Data

Jul. 10, 2017 (IT) .......................... 102017000077459

(51) Int. Cl.
*G01B 11/25* (2006.01)
(52) U.S. Cl.
CPC .................................... *G01B 11/25* (2013.01)
(58) Field of Classification Search
CPC .......... G01B 11/25; G01N 2021/8829; G01N 21/8806

(Continued)

(56) References Cited

U.S. PATENT DOCUMENTS 4,629,319 A 12/1986 Clarke et al.
5,237,404 A 8/1993 Tanaka et al.
(Continued)

FOREIGN PATENT DOCUMENTS

DE 10110994 A1 3/2002
EP 2799810 A1 11/2014
(Continued)

OTHER PUBLICATIONS

Armesto et al., "Inspection System Based on Artificial Vision for Paint Defects Detection on Cars Bodies", ICRA Communications, IEEE, 4 pages (2011).

(Continued)

*Primary Examiner* — Tri T Ton
(74) *Attorney, Agent, or Firm* — Lucas & Mercanti, LLP

(57) ABSTRACT

A device for detecting defects on at least one painted surface may include: a source configured to emit electromagnetic radiation, in at least one first spectral band, in order to project a beam of the radiation onto the at least one painted surface; a video camera sensitive in at least one second spectral band and configured to obtain images of the at least one painted surface in a zone where the beam of the radiation emitted by the source is projected; and a diffuser configured to intercept at least part of the radiation emitted by the source and to make more homogeneous a spatial distribution of radiation intensity over the at least one painted surface. A spectral working band of the device is the at least one first spectral band, the at least one second spectral band, or an intersection of the at least one first and second spectral bands.

20 Claims, 3 Drawing Sheets

(58) Field of Classification Search
USPC ......... 356/600–613, 625–640, 237.1–237.6, 356/239.1–239.8
See application file for complete search history.

(56) References Cited

U.S. PATENT DOCUMENTS

| | | | |
|---|---|---|---|
| 11,105,614 B2* | 8/2021 | De Nisco | ........... G01N 21/8806 |
| 2009/0002695 A1 | 1/2009 | Saito et al. | |
| 2010/0091272 A1 | 4/2010 | Asada et al. | |
| 2011/0181873 A1 | 7/2011 | Yavets-Chen et al. | |
| 2013/0057678 A1 | 3/2013 | Prior Carrillo et al. | |
| 2014/0043602 A1 | 2/2014 | Engel | |
| 2020/0134773 A1 | 4/2020 | Pinter et al. | |

FOREIGN PATENT DOCUMENTS

| | | |
|---|---|---|
| JP | H05322543 A | 12/1993 |
| WO | 2000014478 A1 | 3/2000 |
| WO | 2003016819 A1 | 2/2003 |
| WO | 2008123604 A1 | 10/2008 |
| WO | 2017001897 A1 | 1/2017 |

OTHER PUBLICATIONS

Ritter et al., "Contribution to Analysis of the Reflection Grating Method", Optics and Lasers in Engineering, vol. 4, pp. 13-24 (1983).

Rosati et al., "Real-time defect detection on highly reflective curved surfaces", Optics and Lasers in Engineering, vol. 47, pp. 379-384 (2009).

Sárosi et al., "Detection of Surface Defects on Sheet Metal Parts Using One-Shot Deflectometry in the Infrared Range", FLIR Technical Series, 10 pages (2011).

International Search Report and Written Opinion in corresponding International Application No. PCT/IB2018/055041 dated Nov. 8, 2018, 11 pages.

International Search Report and Written Opinion in corresponding International Application No. PCT/IB2018/055041, dated Nov. 27, 2018, 10 pages.

* cited by examiner

DEVICES FOR DETECTING PAINTING DEFECTS ON AT LEAST ONE PAINTED SURFACE TO BE INSPECTED

CROSS-REFERENCE TO RELATED APPLICATION(S)

This application is a continuation application of U.S. patent application Ser. No. 16/629,530 ("the '530 application"), filed on Jan. 8, 2020, in the U.S. Patent and Trademark Office ("USPTO"), and published as U.S. Patent Publication No. 2020/0173771 A1 on Jun. 4, 2020. The '530 application was a national stage entry from International Application No. PU/IB2018/055041 ("the '041 application"), filed on Jul. 9, 2018, in the Receiving Office ("RO/IB") of the International Bureau of the World Intellectual Property Organization ("WIPO"), and published as International Publication No. WO 2019/012404 A1 on Jan. 17, 2019. The '041 application claims priority under 35 U.S.C. § 119 from Italian Patent Application No. 102017000077459, filed on Jul. 10, 2017, in the Italian Patent and Trademark Office ("ITPO"). The entire contents of all of these applications are incorporated herein by reference.

FIELD OF THE INVENTION

The present invention relates to a device for detecting surface defects, specifically on painted surfaces, according to the preamble of the main claim.

The painted surfaces, specifically the painted surfaces of metal components in the automotive field, have very high quality standards: a small painting defect has to be detected before the part is assembled and leaves the factory.

Generally the defects of painted surfaces, or however of surfaces being subjected to surface treatment, such as for example the resin deposition, comprise clots of paint or resin, dust or impurities that blended with the paint or resin.

Often such defects are three-dimensional, i.e. they are not simply local color variations, but ridges or however irregularities on the surface.

These defects are named in the field "aesthetic" defects since the user can visibly perceive them and thus have the size of at least 10-20 microns.

For this reason such defects also comprise defects such as bumps or lines being on the surface even before the painting operation or also a missed surface cleaning which can result in a paint ripple.

KNOWN PREVIOUS ART

In the state of the art there are different devices based generally on deflectometry, that has been introduced by Ritter and Hahn (Ritter R, Hahn R. *Contribution to analysis of the reflection grating method. Optics and Lasers in Engineering.* 1983; 4(1):13-24).

Usually in deflectometry a light source projecting a plurality of light and dark parallel lines on the surface to be inspected is used.

The image of such lines, reflected by the surface to be inspected, is distorted due to the three-dimensional geometry of the surface.

A localized defect reflects the light in a different way and can thus be visualized as a sudden irregularity of the lines reflected by the test surface.

The deflectometry requires glossy and highly reflective surfaces, since the surface roughness increases the light diffusion in all the directions and decreases the specular reflection.

In JPH05322543 (A) improvements to increase the reliability of the technique have been proposed.

A video camera can capture the images reflected by the surface to be inspected and mathematical algorithms can allow an automated analysis thereof.

In US 2013/0057678 A1 a device for automatically detecting the defects is described, in which the painted body of a car is passed in a tunnel comprising lighting arches and video cameras suitably arranged to automatically detect the distortion of the specular reflection of the lights running on the entire body.

A similar device is also described in "Leopoldo Armesto, Josep Tornero, Alvaro Herraez and Jose Asensio, *Inspection System Based on Artificial Vision for Paint Defects Detection on Cars Bodies, International Conference on Robotics and Automation (ICRA)*, 2011 *IEEE.*"

In "*Detection of Surface Defects on Sheet Metal Parts Using One-Shot Deflectometry in the Infrared Range*" by Zoltan Sarosi, Wolfgang Knapp, Andreas Kunz, Konrad Wegener from IWF, ETH Zurich, Switzerland, the authors propose a variation of the conventional deflectometry wherein the electromagnetic radiation in the thermal infrared band is used, in order to have more specular reflection from rough test surfaces.

In "G. Rosati, G. Boschetti, A. Biondi, A. Rossi, Real-time defect detection on highly reflective curved surfaces, Optics and Lasers in Engineering 47 (2009) 379-384" other advancements of the deflectometric technique are described.

In DE 101 10 994 A1 an automated device for detecting painting defects is described and based on the deflectometric technique.

In U.S. Pat. No. 4,629,319, in order to improve the signal-to-noise ratio, a device is proposed wherein the radiation emitted from a source, such as for example a laser, is reflected from the surface to be inspected and then back reflected from a back-reflecting element, impinging on the surface to be inspected a second time, before being captured by a video camera.

The currently used techniques are based on the specular reflection of light by the surface to be inspected.

For this reason deflectometry requires an accurate positioning of the video camera with respect to the light source and the surface to be inspected.

An issue of the state of the art is the low signal-to-noise-ratio, whereby the defects can not always be detected with certainty.

Another issue is that the detection of the defects depends on the color of the paint and the condition thereof.

A defect, such as for example an orange peel effect painted surface, can hardly be detected by current techniques.

OBJECTS OF THE INVENTION

Object of the present invention is therefore to realize a device and a process which allow overcoming the mentioned drawbacks.

In particular, an object is to realize a device and a process for detecting defects on the surface of elements to be inspected, in particular on painted surfaces, which increases the reliability of the technique and the likelihood of detecting the defect.

Another object is to realize a device and a process for detecting defects on painted elements, which works on all colors.

Another object is to obtain a device simpler than the current ones, with larger freedom of positioning the components.

Said objects are achieved by a device and a process whose inventive features are highlighted by the claims.

BRIEF DESCRIPTION OF THE DRAWINGS

The invention will be better understood by the following specification provided for illustration purposes only, thus without limitation, of a preferred embodiment illustrated in the accompanying drawings in which.

DETAILED DESCRIPTION OF A PREFERRED EMBODIMENT OF THE PRESENT INVENTION

The human eye visible electromagnetic radiation ranges from about 400 nm (purple) to 750 nm (red).

The not-visible radiation beyond the red is named as infrared radiation.

The infrared radiation is categorized in non-thermal infrared (from 750 nm to about 2000 nm) and thermal infrared (beyond 2000 nm).

A body being at room temperature (about 300 K) emits infrared radiation in the thermal infrared band, but not in the non-thermal infrared band, and thus under 2000 nm.

Normal video cameras with CCD or CMOS sensor are sensitive in the 300 nm-1100 nm band and can thus see in the non-thermal infrared region to which the human eye is not sensitive.

This property is used to see in the dark, by using an infrared illuminator, for example a suitable led.

In the field of the non-thermal infrared, an infrared source emits infrared radiation which is reflected by an object and then captured by the sensor of a video camera, such as in the visible.

From about 2500-3000 nm the room temperature bodies emit electromagnetic radiation and such emitted radiation is added to the possibly reflected radiation.

The radiation, emitted by a source and addressed to a surface to be inspected, is partly specularly reflected by the surface and partly and diffusely reflected in all the directions.

The share of radiation diffusely reflected in all the directions increases as the surface roughness of the surface to be inspected increases.

It has surprisingly been found that, while the deflectometric techniques are based on the radiation specularly reflected by the surface to be inspected, the radiation diffusely reflected in all the directions can allow detecting surface and painting defects with a better signal-to-noise ratio and thus a better likelihood of correctly detecting the defect.

Figure 1A:
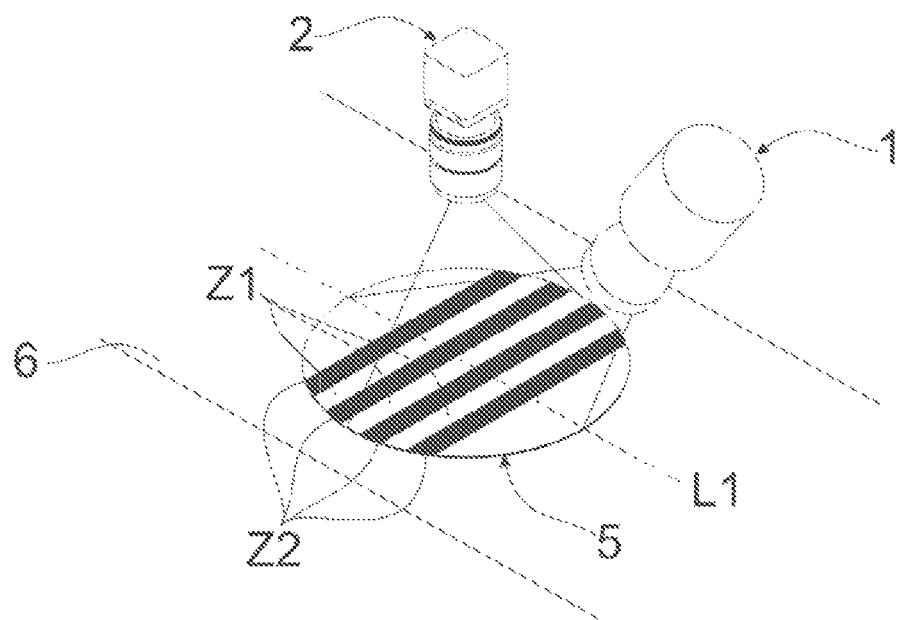
FIG. 1A shows a perspective view of the device according to the invention with the projection of a plurality of high-intensity electromagnetic radiation lines, alternating with low-intensity electromagnetic radiation lines, on the surface to be inspected.
Figure 1B:
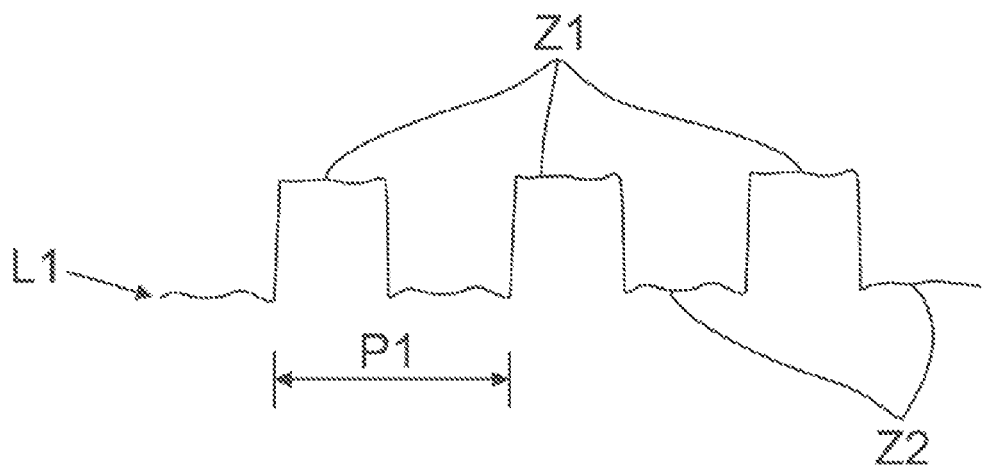
FIG. 1B shows the distribution of the electromagnetic radiation intensity on a line L1 intersecting such high-intensity electromagnetic radiation lines and low-intensity electromagnetic radiation lines in the center part of the beam projected by the source on the surface to be inspected.
Figure 2:
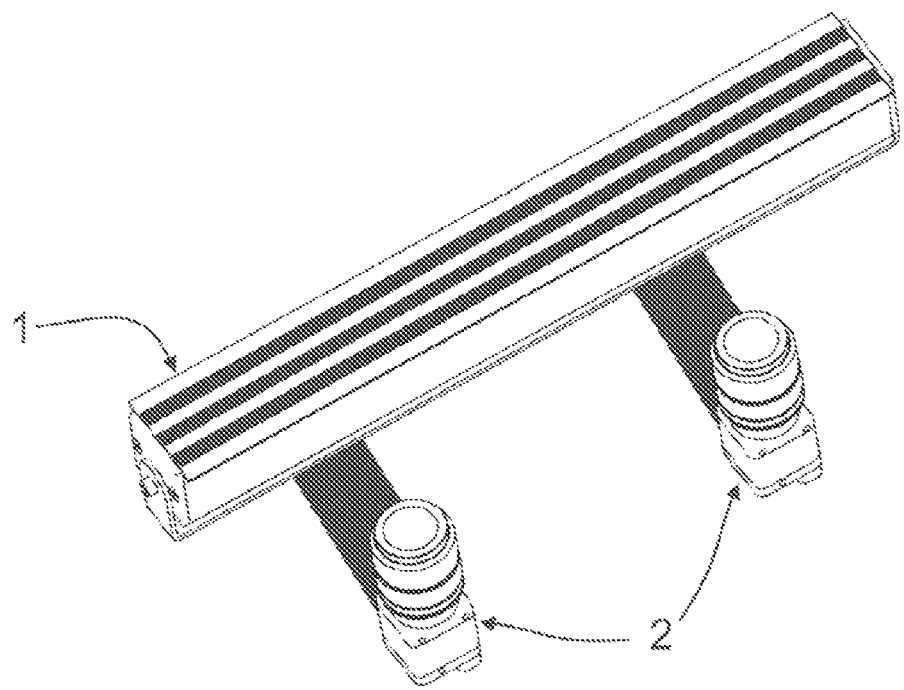
FIG. 2 shows a perspective view of an embodiment of the device according to the invention with an electromagnetic radiation source to which two video cameras are connected.
Figure 3:
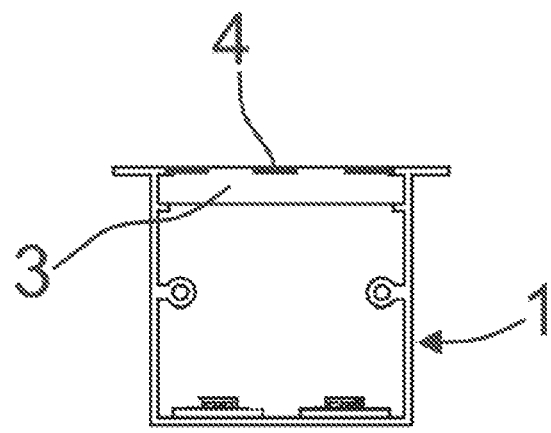
FIG. 3 shows a sectional view of the same source as FIG. 2.
Figure 4:
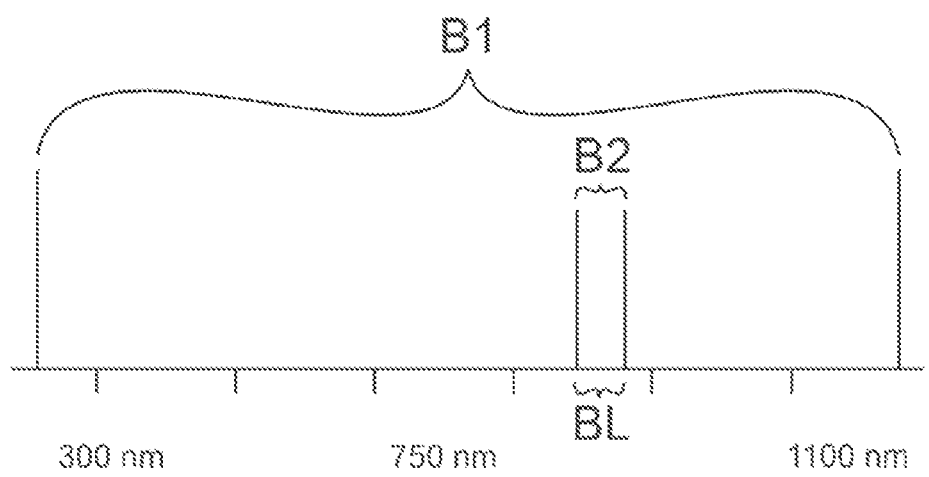
FIG. 4 shows a part of the electromagnetic spectrum with a first emission spectral band of the electromagnetic radiation source, a second spectral band wherein the video camera is sensitive and the spectral working band obtained by the intersection of the first and second spectral bands, said spectral working band coinciding in this case with the second spectral band.

In reference to FIGS. 1 to 3, the device according to the invention for detecting defects on surfaces to be inspected, preferably painted surfaces, is shown, comprising a source 1 adapted to emit electromagnetic radiation in at least one first spectral band B1 (FIG. 4), in order to project a beam of electromagnetic radiation onto at least one surface to be inspected 6, preferably a painted surface;

a video camera 2 sensitive in at least one second spectral band B2 (FIG. 4) and arranged so that to obtain images of said at least one surface to be inspected 6 in the zone wherein the electromagnetic radiation beam emitted by the source 1 is projected, a diffuser 3, adapted to intercept at least part of the electromagnetic radiation emitted by the source 1 and to make more homogeneous the spatial distribution of the intensity of said electromagnetic radiation on said at least one surface to be inspected 6.

The source 1 can be a normal incandescent lamp or a neon or led lamp or any other source, such as for example a laser, emitting in a spectral band B1 which overlaps at least partly to the spectral band B2 wherein the video camera is sensitive.

The intersection between said first band B1 and said second band B2 establishes a spectral working band BL wherein the device is operative.

One of the first and second bands B1 or B2 can be completely comprised in the other one, whereby the spectral working band BL corresponds to one of the two bands. For example it is possible that, as in the example of FIG. 4, the second band B2 wherein the video camera is sensitive is completely comprised in the first band B1 wherein the source emits, whereby the spectral working band BL is corresponding to the second band B2 of the video camera.

Said spectral working band can also comprise several bands, for example one in the visible and one in the non-thermal infrared.

This can be obtained by arranging suitable filters in front of the source or the video camera.

The video camera can comprise a normal black and white video camera with CCD (charge coupled device) or CMOS (complementary metal-oxide semiconductor) sensor which is sensitive in a spectral band from 300 to 1100 nm, thus also comprising a part of non-thermal infrared, to which a filter is put before in order to select the desired spectral working band.

It has been found that better results can be obtained if such spectral working band BL is adequately narrow.

For this reason the spectral working band has a bandwidth lower than or equal to 200 nm and is between 300 nm and 1100 nm.

As visible in FIG. 3, the diffuser 3 can comprise an opaline or a milky semitransparent element interposed between the source 1 and the surface 6 to be inspected.

While a normal lamp or light source lightens a surface with non-homogeneous intensity, the device according to the invention obtains better results when the intensity of the emitted electromagnetic radiation is homogeneously distributed over the surface to be inspected.

This can be obtained by moving the source away from the surface to be inspected, but the intensity of the electromagnetic radiation decreases with the well known square of the distance law.

The diffuser 3 helps to make more homogeneous the distribution of the intensity of the electromagnetic radiation emitted by the source 1.

Better results are obtained when the spectral working band BL is adequately narrow and has therefore a bandwidth lower than or equal to 50 nm, even better if said spectral working band BL has a bandwidth lower than or equal to 20 nm.

It has also been found that better results are obtained if such a spectral working band BL is arranged in the non-thermal infrared, for example if the spectral working band BL is between 750 nm and 1050 nm.

Even better if said spectral working band BL is between 800 nm and 900 nm, thus adequately far from the visible radiation.

Better if said spectral working band BL is between 810 nm and 860 nm.

Based on the experiments carried out, it has been found that the optimum is obtained in two spectral working bands BL, the first one between 825 nm and 835 nm and the second one between 840 nm and 860 nm.

As it has been seen from the mentioned previous art, the currently existing devices often project onto the surface to be inspected a plurality of light and dark lines, which alternate a high light intensity and a low light intensity.

The presence of lines or however of a spatial arrangement alternating high-intensity electromagnetic radiation zones with low-intensity electromagnetic radiation zones onto the surface to be inspected allows better results to be obtained, also in the device according to the invention.

For this reason the device according to the invention comprises an intensity alternator 4 adapted to intercept, after the diffuser 3, the electromagnetic radiation emitted by the source 1 and to generate, on said at least one surface to be inspected 6, a spatial arrangement 5 of the electromagnetic radiation comprising high-intensity electromagnetic radiation zones alternating with low-intensity electromagnetic radiation zones.

Preferably (FIG. 1A and FIG. 1B) such a spatial arrangement 5 of the intensity distribution of the electromagnetic radiation emitted by the source comprises a plurality of high-intensity electromagnetic radiation lines Z1 alternating with low-intensity electromagnetic radiation lines Z2, said lines Z1 and Z2 being substantially parallel.

Other spatial arrangements, such as for example circular concentric lines, are of course possible.

In said spatial arrangement 5, which is projected onto the surface to be inspected, the alternation of high-intensity electromagnetic radiation lines Z1 with low-intensity electromagnetic radiation lines Z2 creates a repetitive figure, wherein the pitch P1 (FIG. 1B) of such a repetition is preferably small, lower than or equal to 20 mm, better if lower than or equal to 4 mm.

The size of such a pitch P1 also depends on the minimum size of the defect desired to be detected.

It is of course possible that the duty-cycle varies between 5% and 95%, i.e. that the thickness of the high-intensity electromagnetic radiation lines Z1 is different from that of the low-intensity electromagnetic radiation lines Z2, specifically that the thickness of the high-intensity electromagnetic radiation lines Z1 is smaller than that of the low-intensity electromagnetic radiation lines.

It is preferable that, by also using particular focusing optics, the electromagnetic radiation emitted from the source is adequately diffused such that the passage from a high-intensity electromagnetic radiation zone to an adjacent low-intensity electromagnetic radiation zone is substantially stepped and the intensity of the electromagnetic radiation in the high-intensity electromagnetic radiation zone is homogeneous.

Referring to FIG. 1 it can be seen that, in the center portion of the beam of electromagnetic radiation projected by the source 1 and in the spectral working band BL, the distribution of the electromagnetic radiation intensity over a line L1 intersecting such high-intensity electromagnetic radiation zones (Z1) and low-intensity electromagnetic radiation zones (Z2) is preferably a substantially square wave function, with steep rising edge and falling edge and substantially uniform values in the high-intensity electromagnetic radiation zone Z1 and in the low-intensity electromagnetic radiation zone Z2.

Both in the low-intensity electromagnetic radiation zone Z2 and the high-intensity electromagnetic radiation zone Z1 the ambient lightning can create a decrease in contrast and saturation and, if not arranged homogeneously, can determine a lower homogeneity of the radiation intensity.

For a better sensitivity of the device to defects, the video camera is preferred not to reach the saturation, when observing the high-intensity electromagnetic radiation zone Z1 on a defect-free surface to be inspected.

The spectral working band may comprise two or more different spectral bands and the image acquisition may occur simultaneously on said spectral bands or in temporal succession (first on a band and then on another band).

The images obtained on different bands are overlapped or processed together in accordance with convenient mathematical algorithms, in order to improve the signal-to-noise ratio and increase the likelihood of detecting possible defects being on the surface to be inspected.

Conversely to the devices based on deflectometric techniques, in the device according to the invention the relative position of the source and the video camera is not relevant.

In the rendering of FIG. 2, source 1 and video camera 2 are close together and mutually constrained.

The video camera and the source are preferably arranged along a direction normal to the surface to be inspected.

Such an arrangement is not usually adopted in the deflectometric techniques since, in order to obtain better sensitivity, it is preferred that the electromagnetic radiation emitted by the source impinge onto the surface to be inspected with an angle of at least 45° with respect to the normal, whereas the video camera is arranged in the specular direction with respect to the incidence direction of the electromagnetic radiation.

In its operation the source 1 projects onto the surface to be inspected a beam of electromagnetic radiation having homogeneous high-intensity electromagnetic radiation zones alternating with low-intensity electromagnetic radiation zones, for example a strip spatial arrangement 5.

The video camera 2 captures the surface to be inspected in the center portion of the beam projected by the source 1.

The presence of a defect locally alters the homogeneity of the radiation intensity or locally deforms the spatial arrangement, thus allowing the defect to be detected.

For example, the defect can appear as low intensity spots in the high-intensity electromagnetic radiation zones and/or as high intensity spots in the low-intensity electromagnetic radiation zones, or as a distortion of the edges wherein the passage between a high-intensity electromagnetic radiation zone and a low-intensity electromagnetic radiation zone occurs.

Preferably the surface to be inspected runs with respect to the device according to the invention such that the scan of the whole surface to be inspected can be obtained quickly.

An electronic device for image analysis can easily and automatically detect the defects with high reliability.

The present invention also wants to protect a process for detecting defects on surfaces to be inspected, preferably on painted surfaces, comprising the following steps:

a) obtaining an electromagnetic radiation source 1 adapted to emit electromagnetic radiation in at least one first spectral band B1;

b) projecting a beam of electromagnetic radiation on at least one surface to be inspected;

c) obtaining a video camera 2 sensitive in at least one second spectral band B2, the intersection between said first band B1 and said second band B2 determining a non-null spectral working band BL;

d) arranging the video camera 2 so that to obtain images of said at least one surface to be inspected in the incidence zone of the electromagnetic radiation beam emitted by the source 1;

e) obtaining a diffuser 3 adapted to make more homogeneous the spatial distribution of the intensity of the electromagnetic radiation emitted by the source;

f) arranging the diffuser 3 so that to intercept at least part of the electromagnetic radiation emitted by the source 1 and to make more homogeneous its intensity;

g) obtaining an intensity alternator 4 adapted to obtain a spatial arrangement 5 of the electromagnetic radiation alternating high-intensity electromagnetic radiation zones with low-intensity electromagnetic radiation zones;

h) arranging the intensity alternator 4 so to intercept, after the diffuser 3, the electromagnetic radiation emitted by the source 1 so that to create, on the surface to be inspected, high-intensity electromagnetic radiation zones alternating with low-intensity electromagnetic radiation zones;

i) obtaining images of the spatial arrangement 5 of the intensity of the electromagnetic radiation over said surface to be inspected from the video camera;

j) identifying defects appearing lower intensity spots in the high-intensity electromagnetic radiation zones and/or appearing higher intensity spots in the low-intensity electromagnetic radiation zones.

It is of course possible that the process comprises the image acquisition on different spectral working bands and the processing of said images by means of mathematical algorithms adapted to increase the signal-to-noise ratio and the likelihood of detecting a defect that might be on the surface to be inspected.

Thanks to the electromagnetic radiation being distributed homogeneously at least in the high-intensity electromagnetic radiation zones, the detection of the painting or geometric and aesthetic defects is made easier with respect to other today existing devices and the signal-to-noise ratio is improved, with higher reliability of the device.

The inspection can of course be expected to be done in the visible spectrum by a human operator, thus without a video camera.

The surfaces that can be inspected are not only painted surfaces, but also surfaces having been subjected or not to a surface treatment, such as resin deposition or even a transparent coating.

It is also possible, but not preferable, that the device according to the invention does not use an intensity alternator in order to have high-intensity electromagnetic radiation zones alternating with low-intensity electromagnetic radiation zones, but simply a diffuser in order to have an homogeneous distribution of the intensity of the electromagnetic radiation emitted by the source over the surface to be inspected.

An adequate homogeneity of the electromagnetic radiation distribution over the surface to be inspected is often enough.

An advantageous characteristic of the invention is that, conversely to the devices based on the deflectometric technique, the device according to the invention allows wide freedom in the arrangement of the video camera and the source.

The invention claimed is:

1. A device for detecting painting defects on at least one painted surface to be inspected, the device comprising:
   a source configured to emit electromagnetic radiation, in at least one first spectral band, in order to project a beam of the electromagnetic radiation onto the at least one painted surface to be inspected;
   a video camera sensitive in at least one second spectral band and configured to obtain images of the at least one painted surface to be inspected in a zone where the beam of the electromagnetic radiation emitted by the source is projected; and
   a diffuser configured to intercept at least part of the electromagnetic radiation emitted by the source and to make more homogeneous a spatial distribution of intensity of the electromagnetic radiation over the at least one painted surface to be inspected;
   wherein a spectral working band of the device is the at least one first spectral band if the at least one first spectral band is entirely contained within the at least one second spectral band, wherein the spectral working band of the device is the at least one second spectral band if the at least one second spectral band is entirely contained within the at least one first spectral band, and wherein the spectral working band of the device is an intersection of the at least one first spectral band and the at least one second spectral band if the at least one first spectral band overlaps the at least one second spectral band,
   wherein the spectral working band has a bandwidth less than or equal to 200 nanometers (nm), and
   wherein the spectral working band is comprised between 300 nm and 1,100 nm.

2. The device of claim 1, wherein the spectral working band has a bandwidth less than or equal to 50 nm.

3. The device of claim 1, wherein the spectral working band has a bandwidth less than or equal to 20 nm.

4. The device of claim 1, wherein the spectral working band is comprised between 750 nm and 1,050 nm.

5. The device of claim 1, wherein the spectral working band is comprised between 800 nm and 900 nm.

6. The device of claim 1, wherein the spectral working hand is comprised between 810 nm and 860 nm.

7. The device of claim 1, wherein the spectral working hand is comprised between 825 nm and 835 nm.

8. The device of claim 1, wherein the spectral working band is comprised between 840 nm and 860 nm.

9. The device of claim 1, wherein the spectral working band comprises two or more distinct spectral working bands.

10. The device of claim 1, wherein the spectral working band comprises first and second spectral working bands, wherein the first spectral working band differs from the second spectral working band, wherein the first spectral working band is comprised between 800 nm and 900 nm, and wherein the second spectral working band is comprised between 800 nm and 900 nm.

11. The device of claim 1, wherein the spectral working band comprises first and second spectral working bands, wherein the first spectral working band differs from the second spectral working band, wherein the first spectral working band is comprised between 810 nm and 860 nm, and wherein the second spectral working band is comprised between 810 nm and 860 nm.

12. The device of claim 1, wherein the spectral working band comprises first and second spectral working bands, wherein the first spectral working band is comprised between 825 nm and 835 nm, and wherein the second spectral working band is comprised between 840 nm and 860 nm.

13. The device of claim 1, wherein the spectral working band is the at least one first spectral band.

14. The device of claim 1, wherein the spectral working band is the at least one second spectral band.

15. The device of claim 1, wherein the spectral working band is the intersection of the at least one first spectral band and the at least one second spectral hand.

16. A device for detecting painting defects on at least one painted surface to be inspected, the device comprising:

a source configured to emit electromagnetic radiation, in at least one first spectral band, in order to project a beam of the electromagnetic radiation onto the at least one painted surface to be inspected;

a video camera sensitive in at least one second spectral band and configured to obtain images of the at least one painted surface to be inspected in a zone where the beam of the electromagnetic radiation emitted by the source is projected;

a diffuser configured to intercept at least part of the electromagnetic radiation emitted by the source and to make more homogeneous a spatial distribution of intensity of the electromagnetic radiation over the at least one painted surface to be inspected; and an intensity alternator configured to intercept, after the diffuser, the electromagnetic radiation emitted by the source and to generate, on the at least one painted surface to be inspected, a spatial arrangement of the electromagnetic radiation comprising high-intensity electromagnetic radiation zones alternating with low-intensity electromagnetic radiation zones;

wherein a spectral working band of the device is the at least one first spectral band if the at least one first spectral band is entirely contained within the at least one second spectral band, wherein the spectral working band of the device is the at least one second spectral band if the at least one second spectral band is entirely contained within the at least one first spectral band, and wherein the spectral working band of the device is an intersection of the at least one first spectral band and the at least one second spectral band if the at least one first spectral band overlaps the at least one second spectral band, wherein the spectral working band has a bandwidth less than or equal to 200 nanometers (nm), and wherein the spectral working band is comprised between 300 nm and 1,100 nm.

17. The device of claim 16, wherein the spatial arrangement comprises a plurality of high-intensity electromagnetic radiation lines alternating with low-intensity electromagnetic radiation lines.

18. The device of claim 17, wherein the high-intensity electromagnetic radiation lines alternating with the low-intensity electromagnetic radiation lines have a pitch less than or equal to 20 millimeters (mm).

19. The device of claim 17, wherein the high-intensity electromagnetic radiation lines alternating with the low-intensity electromagnetic radiation lines have a pitch less than or equal to 4 millimeters (mm).

20. The device of claim 17, wherein the alternating between a first one of the high-intensity electromagnetic radiation lines and an adjacent one of the low-intensity electromagnetic radiation lines is substantially stepped.

* * * * *